(12) United States Patent
Mahamuni et al.

(10) Patent No.: US 8,806,573 B2
(45) Date of Patent: Aug. 12, 2014

(54) AUTHENTICATION CONTROL IN LOW-POWER LOSSY NETWORKS

(75) Inventors: Atul Mahamuni, Fremont, CA (US); Navindra Yadav, Cupertino, CA (US); Jonathan Hui, Foster City, CA (US); Alec Woo, Union City, CA (US); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 143 days.

(21) Appl. No.: 13/206,012

(22) Filed: Aug. 9, 2011

(65) Prior Publication Data
US 2013/0042301 A1 Feb. 14, 2013

(51) Int. Cl.
*H04L 9/32* (2006.01)

(52) U.S. Cl.
USPC ............... 726/3; 726/2; 726/4; 726/5; 726/6; 726/7; 726/8; 713/168; 713/169; 713/170; 713/171; 713/172; 713/173; 713/174; 713/182; 713/183; 713/184; 713/185; 713/186; 709/225; 709/229

(58) Field of Classification Search
USPC .............. 713/168–174, 182–186; 726/2–8; 709/225, 229
See application file for complete search history.

(56) References Cited

U.S. PATENT DOCUMENTS

| | | | | |
|---|---|---|---|---|
| 7,451,314 | B2 * | 11/2008 | Vallee et al. | 713/170 |
| 7,539,777 | B1 * | 5/2009 | Aitken | 709/248 |
| 2004/0177353 | A1 * | 9/2004 | Rao | 717/171 |
| 2005/0120203 | A1 * | 6/2005 | Yeh et al. | 713/156 |
| 2006/0026670 | A1 * | 2/2006 | Potter et al. | 726/7 |
| 2006/0168648 | A1 * | 7/2006 | Vank et al. | 726/4 |
| 2010/0248816 | A1 * | 9/2010 | Liber et al. | 463/25 |

OTHER PUBLICATIONS

"Identity-Based Networking Services: IEEE 802.1X Development Guide", C07-627531-02, Cisco Systems, Inc., 2010, 33 pages.
"EAP Authentication with Radius Server", Cisco Systems, Inc., Document ID 44844, Oct. 19, 2009, 13 pages.
"EAP Authentication with WLAN Controllers (WLC) Configuration Example", Cisco Systems, Inc., Document ID 69730, Sep. 3, 2010, 20 pages.

* cited by examiner

*Primary Examiner* — Thanhnga B Truong
*Assistant Examiner* — Josnel Jeudy
(74) *Attorney, Agent, or Firm* — Edell, Shapiro & Finnan, LLC

(57) ABSTRACT

Techniques are provided for the controlled scheduling of the authentication of devices in a lossy network, such as a mesh network. An authenticator device that is configured to authenticate devices in a lossy network receives an authentication start message from a particular device to be authenticated. The authenticator device determines a schedule for engaging in an authentication procedure for the particular device based on an indication of current network utilization.

35 Claims, 7 Drawing Sheets

US 8,806,573 B2

AUTHENTICATION CONTROL IN LOW-POWER LOSSY NETWORKS

TECHNICAL FIELD

The present disclosure relates to authenticating devices in a low-power lossy network.

BACKGROUND

Low-Power Lossy Networks (LLNs) may be used in a variety of applications, including intelligent power distribution networks, so called "Smart Grid" applications. Due to the embedded nature of LLNs, they are typically deployed in public and uncontrolled environments. For this reason, implementing strong security in LLNs is an application requirement.

The IEEE 802.1X standard provides a method for network access control. An IEEE 802.1X authentication involves three entities:

Supplicant: a device that wishes to join a network.

Authenticator: a network device (i.e., switch or access point) that a Supplicant communicates with to gain access to the network.

Authentication Server: a device that the Authenticator communicates with to validate the credentials of a Supplicant.

In traditional networks, the Supplicant and Authenticator are in direct link-layer communication. For example, in Ethernet switched networks, the access switch (irrespective of whether it is running as a Layer 2 or Layer 3 switch) terminates the authentication exchange with the end host. In IEEE 802.11 (WiFi™) wireless networks the access point terminates the authentication exchange when running in autonomous mode. If the access point is running in a split media access control (MAC) mode, then the wireless controller terminates the authentication process.

However, the large-scale and ad-hoc nature of LLNs require an architecture that allows a Supplicant and Authenticator to communicate over multiple routed Internet Protocol (IP) hops. In an Advanced Meter Infrastructure (AMI) deployment, the Authenticator is hosted on one or more Field Area Routers and LLN devices may use several IP hops to reach a Field Area Router. There may be thousands of LLN devices all of which, at some point in time, need to be authenticated.

DESCRIPTION OF EXAMPLE EMBODIMENTS

Overview

Techniques are provided for the controlled scheduling of the authentication of devices in a lossy network. An authenticator device that is configured to authenticate devices in a lossy network receives an authentication start message from a particular device to be authenticated. The authenticator device determines a schedule for engaging in an authentication procedure for the particular device based on an indication of current network utilization.

Example Embodiments

The following techniques are useful to allow low-power lossy network (LLN) devices to efficiently and effectively negotiate network access with an authenticator device. The authenticator device intelligently manages authentication negotiations and in so doing limits the amount of network capacity used for negotiating network access to allow other traffic to flow even while many devices are requesting network access. Subject to the traffic constraints, these techniques also minimize the time it takes for devices to obtain network access, taking into account current network conditions and other policy information as described herein.

The following is described with reference to IEEE 802.1X, which is an IEEE standard for port-based network access control. The IEEE 802.1X standard is part of the IEEE 802.1 group of networking protocols. It provides an authentication mechanism to devices seeking to attach to a local area network (LAN) or wireless LAN (WLAN). IEEE 802.1X defines the encapsulation of the Extensible Authentication Protocol (EAP) over IEEE 802 which is known as "EAP over LAN" or EAPOL. However, the references to IEEE 802.1X herein are only an example and the techniques described herein are not limited to IEEE 802.1X.

The 802.1X negotiation requires the Supplicant and Authenticator to exchange a significant number of messages. The authentication negotiation and temporal key negotiation handshakes require at least 18 messages assuming small X.509 certificates. For an Advanced Meter Infrastructure (AMI) deployment where 5000 or more devices communicate through a single Field Area Router on a several hundred kbps radio link, the communication overhead is non-trivial. When multiple devices are requesting network access, care needs to be taken to avoid saturating the link. Furthermore, an Authenticator needs to take into account the dynamic link characteristics and lossy nature of LLNs to efficiently and effectively negotiate network access.

Figure 1:
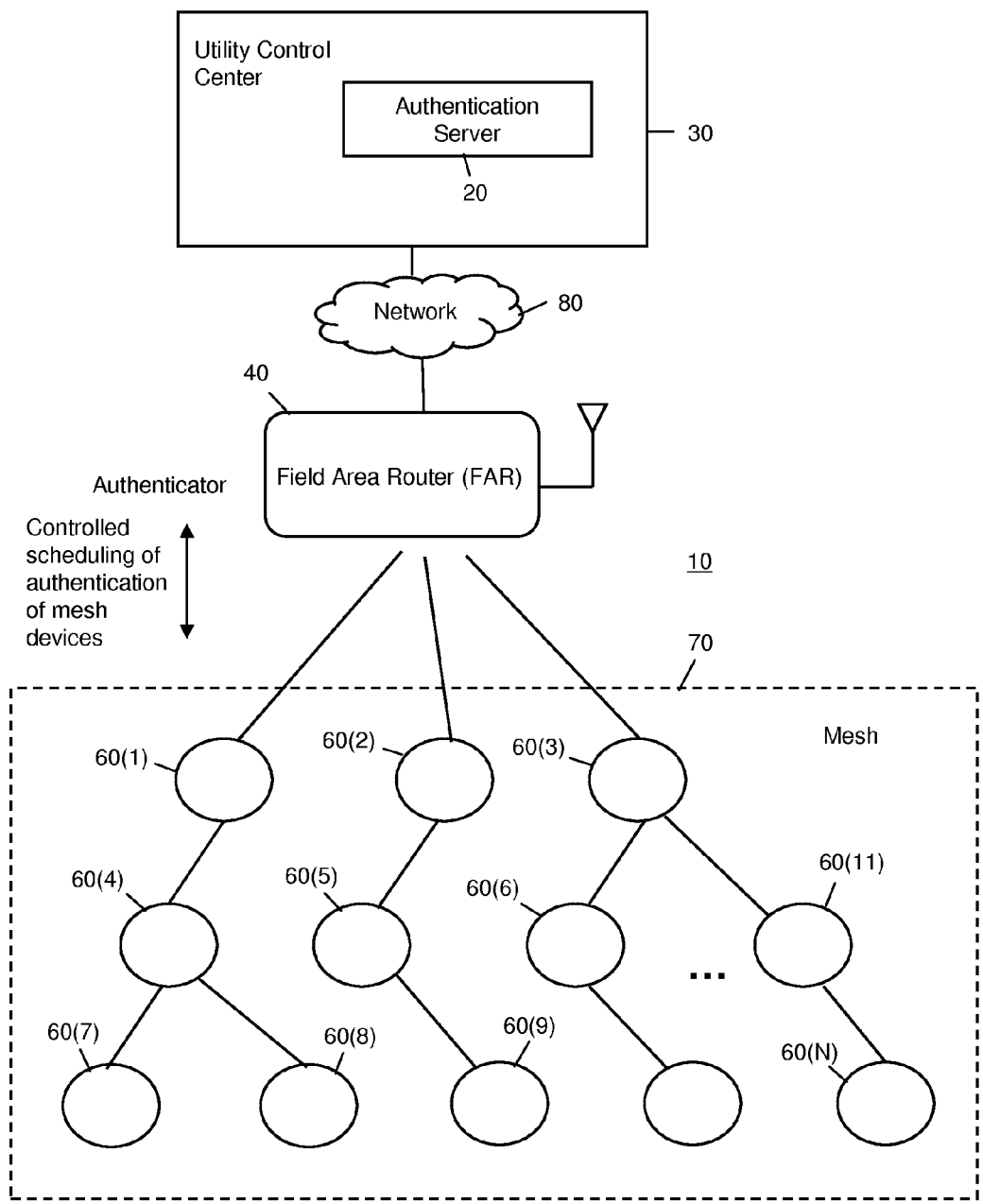
FIG. 1 is a block diagram depicting an example of a low-power lossy network in which an authenticator device is configured to perform controlled scheduling of authentication of mesh devices.

Referring to FIG. 1, a block diagram is described that shows an example of a LLN 10 in which an Authenticator is configured to perform controlled scheduling of authentication of Supplicants. There is an authentication server 20 that may be resident in a utility control center 30. The LLN 10 comprises a Field Area Router (FAR) 40 and a plurality of wireless node devices 60(1)-60(N). The wireless node devices 60(1)-60(N) are part of a "mesh" network of wireless devices. The wireless mesh is shown at reference numeral 70. The wireless devices 60(1)-60(N) in the wireless mesh 70 may communicate with each other and the FAR 40 according to the IEEE 802.15.4 communication standard. The FAR 40 communicates with the authentication server 20 by way of the network 80.

The FAR 40 provides wide area network (WAN) connectivity for the wireless devices 60(1)-60(N) in the LLN 10 and hosts the authentication functions. In so doing, the FAR 40 communicates with the authentication server 20 to verify the identity of the device seeking authentication as part of the authentication process. The FAR 40 also serves as an enforcement point and drops all link frames that are not protected using the keying material, unless such link frames are part of the network access control negotiation from a joining wireless device. There may be multiple FARs in a given LLN and for simplicity a single FAR 40 is shown, but it is to be understood that this is by way of example only.

Examples of uses for the following techniques are utility (e.g., power) distribution system deployments, such as AMI utility networks. In a utility network deployment, the wireless devices 60(1)-60(N) are meter devices, switches and other power distribution or telemetry devices that are remotely controlled by a suitable management server (not shown in FIG. 1). Before these devices can actively participate in these power distribution and telemetry functions, they need to be authenticated. Authentication involves an exchange of messages between the wireless device to be authenticated and the FAR 40. The FAR 40 serves as an Authenticator.

Authenticated Devices are devices are that have already been authenticated and gained network access from a FAR to obtain link-layer keying material. Authenticated Devices also serve as enforcement points and drop all link frames that are not protected using the keying material, unless such link frames are part of the network access control negotiation from a Joining Device. The FAR 40 may also be considered an Authenticated Device.

Joining Devices are devices that are seeking/requesting network access from an Authenticator. Such devices may communicate directly with the FAR 40 or through an Authenticated Device. The Authenticated Device serves as a proxy for IEEE 802.1X negotiations. Depending on the location of the device, it may be one hop, two hops, three hops, etc., from the FAR 40. For example, in FIG. 1, wireless devices 60(1), 60(2) and 60(3) are all one hop from the FAR 40, wireless devices 60(4), 60(5), 60(6) and 60(11) are all two hops from the FAR 40, and wireless devices 60(7), 60(8), 60(9) and 60(10) are all three hops from the FAR 40.

While the techniques presented herein are described in connection with a wireless LLN (e.g., a wireless mesh network), this is only an example and not meant to be limiting. LLNs are not necessarily constrained to wireless networks and can also apply to wired environments. For example, Power Line Communication technology is a wired connectivity technology that exhibits many of the same characteristics as wireless mesh networks (relatively high loss rates compared to traditional link technologies used in IP networks, time-varying link qualities and interference, and a communication medium that is not a single broadcast domain, etc.). In general, an LLN refers to any network that communicates over links that exhibit higher loss rates than a typical Ethernet-based network and connectivity is not well-defined by physical connections. Thus, the techniques described herein are applicable to wireless and wired LLN environments.

During initial network bringup and when there is a reboot event due to a power outage (when the keying material expires during the power outage event), for example, all the devices in the mesh 70 need to authenticate even if they were authenticated prior to the power outage. In this case, there may be thousands of devices that are trying to authenticate over the generally unreliable and lossy links of the LLN 10. When the FAR 40 does not respond to the authentication requests, the devices keep re-sending their authentication initiation/start messages, causing more traffic in the LLN 10, which in turn cause more losses and retries, and so on. As a result, none of the devices can become authenticated. Even when the FAR 40 is not overloaded with authentication requests from numerous devices, the FAR 40 may be occupied with other routing operations that will impact its ability to perform its authentication duties. Thus, one of the goals of the techniques described herein is to address the situation when the FAR 40 is busy with other operations or is overloaded with authentication requests from numerous devices at substantially the same time.

Figure 2:
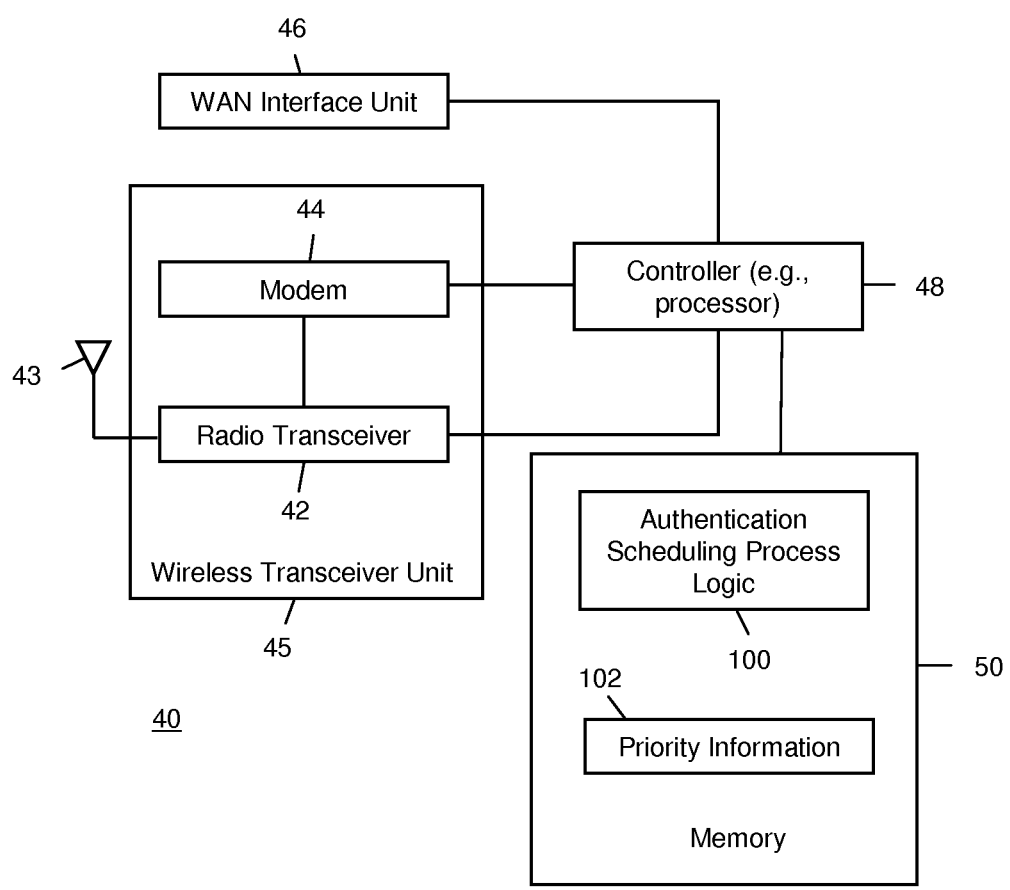
FIG. 2 is a block diagram showing an example of the authenticator device configured for controlled scheduling of authentication of mesh devices.

Reference is now made to FIG. 2 for a description of a block diagram of the FAR 40 according to one example. The FAR 40 is a device that is configured to wirelessly communicate with the wireless devices in the mesh 70 and to communicate over a WAN connection on behalf of the devices in the mesh 70 for data/control purposes as well as to authenticate the wireless devices in the mesh 70. To this end, the FAR 40 comprises a radio transceiver 42, at least one antenna 43, a modem 44, a WAN interface unit 46, a controller 48 and a memory 50. The WAN interface unit 46 may be a wired network interface unit (e.g., an Ethernet card) or a wireless interface unit (e.g., cellular or WiMAX™ interface wireless interface unit). In one example, the radio transceiver 42 and modem 44 comprise one or more integrated circuit chips that are configured to perform wireless communication in accordance with the IEEE 802.15.4 communication protocol to communicate with the wireless devices in the mesh 70. The radio transceiver 42 and modem 44 may be considered parts of a wireless transceiver unit 45. The WAN interface unit 46 enables WAN communications so that the FAR 40 can communicate with the authentication server 30 as well as other servers reachable over a LAN or WAN. The controller 48 is a data processor, e.g., a microprocessor or microcontroller, that is configured to execute software instructions stored in memory 50. In the case in which the LLN is a wired network, then the wireless transceiver unit 45 is a transceiver unit comprising a transceiver 42 and a modem 44 that are configured for wired communication over a wired (copper or optical) network media.

The memory 50 may comprise read only memory (ROM), random access memory (RAM), magnetic disk storage media devices, optical storage media devices, flash memory devices, electrical, optical, or other physical/tangible memory storage devices. The memory 50 stores computer executable software instructions for authentication scheduling process logic 100. The authentication scheduling process logic 100 comprises software instructions that cause the controller 48 to schedule the manner in which the FAR 40 handles authentication requests according to the techniques described herein. Thus, in general, the memory 50 may comprise one or more tangible computer readable storage media (e.g., a memory device) encoded with software comprising computer executable instructions and when the software is executed (by the controller 48) it is operable to perform the operations described herein in connection with process logic 100. The memory 50 also stores priority information/data 102 indicating priority of types of devices such that some devices are assigned a higher relative priority than other devices based on types of service functions the devices perform in a utility network, as described hereinafter.

FIG. 2 thus depicts an apparatus comprising a network interface unit configured to enable communications over a wide area network, a transceiver unit configured to transmit and receive signals over a lossy network, and a processor coupled to the network interface unit and the transceiver unit. The processor is configured to, for an authentication start message received from a particular device to be authenticated, determine a schedule for engaging in an authentication procedure for the particular device based on one or more of a priority associated with the particular device, an indication of current network utilization and number of other devices scheduled for authentication.

Moreover, FIG. 2 further depicts, in another form, one or more computer readable storage media encoded with software comprising computer executable instructions and when the software is executed operable to: for an authentication start message received from a particular device to be authenticated, determine a schedule for engaging in an authentication procedure for the particular device based on one or more of a priority associated with the particular device, an indication of current network utilization and number of other devices scheduled for authentication.

Figure 3:
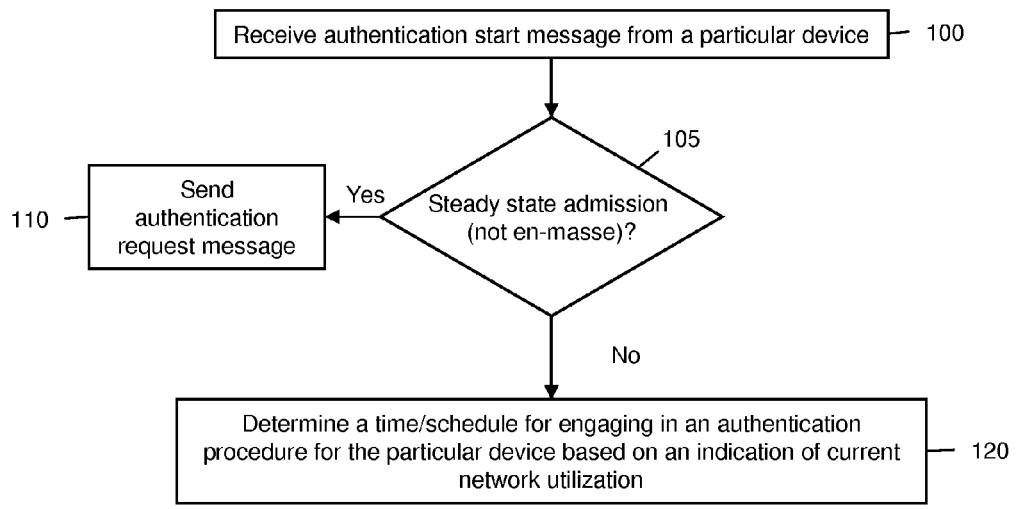
FIG. 3 is a flow chart generally depicting operations for the controlled scheduling of authentication of devices.
Figure 4:
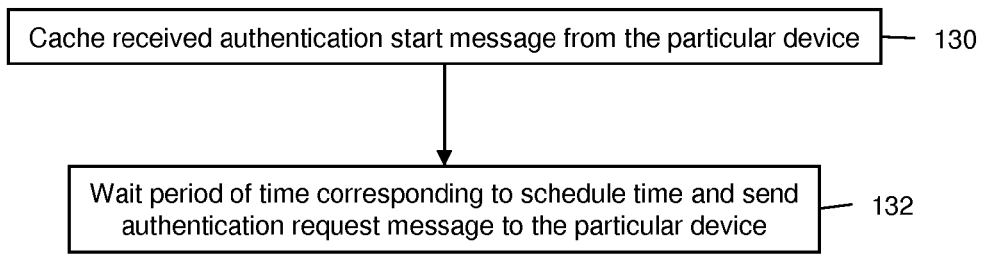
FIG. 4 is a flow chart depicting examples of operations for the controlled scheduling of authentication of devices according to one embodiment.

Reference is now made to FIGS. 3 and 4, with continued reference to FIG. 1, for operations of the authentication scheduling process logic 100 according to one example embodiment.

A Joining Device discovers neighboring networks by listening for link-specific Beacon messages from Authenticated Devices. When a Joining Device determines an acceptable neighbor to communicate with in order to request network access, it begins unicasting Access Request messages in the form of authentication start messages (i.e., EAPOL Start messages in IEEE 802.1X) to an Authenticated Device. The Authenticated Device will then forward the Access Request message to the FAR 40 (i.e., the Authenticator).

The Joining Device occasionally transmits Access Request messages to notify the Authenticator that is waiting to negotiate network access. The Joining Device transmits Access Request messages using an increasing transmission window. The transmissions begin with a short window and each successive window doubles up to a maximum threshold. Within each window, the Joining Device chooses a random time to transmit the Access Request message. The minimum and maximum size of the window may be hard-coded or negotiated in the Beacon messages.

The EAP negotiation and handshake for negotiating temporal keys are Authenticator-driven. Joining Devices only transmit replies in response to a request from the Authenticator. Furthermore, EAP is a lock-step protocol, allowing only one outstanding request to a Joining Device to be sent at a time. However, it does not prevent sending multiples requests to different Joining Devices simultaneously.

To limit the amount of network capacity used for negotiating network access, the Authenticator controls the rate of sending request messages to Joining Devices. One goal is to maximize the rate of granting (or denying) network access while remaining below a certain capacity utilization. In other words, a goal is to maximize the authentication throughput, rather than just focusing on the system throughput.

Because LLN traffic typically flows through the FAR, the link at the FAR typically experiences the highest amount of congestion. As such, the Authenticator functions are primarily concerned with the average utilization of the FARs link caused by network access negotiations. The link utilization can be approximated by the rate of transmitting request messages and receiving response messages along with their respective messages sizes.

Reference is now made to FIG. 3 for a general description of the operations of the authentication scheduling process logic 100. In the context of the operations shown in FIG. 3, the FAR 40 is operating as the Authenticator. A Supplicant (a device seeking authentication) sends a normal authentication start message, which in the case of IEEE 802.1X is an EAPOL-START message. At 105, the FAR 40 receives the authentication start message from a particular device. At 110, the FAR 40 determines whether it is currently able to process the authentication request. Generally, when the FAR 40 is not overloaded due to either an en-mass authentication event or overburdened with other responsibilities, it is said to be in a "steady state admission" mode and accordingly can process the authentication start message normally by sending an authentication request message back to the wireless device at 115. However, when the FAR 40 is not in a steady state admission mode or when it is otherwise configured to apply a controlled/managed scheduling of authentication of devices, at 120, the FAR 40 determines a time or schedule for engaging in an authentication procedure for the particular device based on an indication of current network utilization. Network utilization means, for example, how much the network is currently being used in terms of the number of and/or size of messages being transmitted in the network that may affect the throughput in the network. As explained hereinafter, a measure of current network utilization (at any given point in time) can be derived from round-trip time delay or other information included in messages sent by devices or derived from messages sent by devices. Other criteria on which the schedule for authentication may be based include the number of other devices scheduled for authentication as well as a priority associated with a particular device. The priority of a particular device is represented by information contained in the authentication start message that indicates the type of device, and thus the functions that it performs in the context of a utility network, for example. The FAR 40 can reference the stored priority information 102 (FIG. 2) when determining the schedule for authenticating the particular device. The information may be simple logic (e.g., nodes indicating priority 1 in the start message have higher priority than nodes indicating priority 2, 3, or more).

FIG. 4 illustrates a flow chart of a first example for controlled scheduling of authentication of devices as depicted by operation 120 shown in FIG. 3. In this example, the FAR 40 sends the authentication request message to a device at a scheduled time. At 130, the FAR 40 caches the received authentication message or records state to engage in the authentication with the originator of message from a particular device. At 132, based on a scheduled time determined to engage in the authentication procedure for the particular device, the FAR sends an authentication request message as part of the authentication procedure to the particular device. Additional details related to this example are described hereinafter in connection with FIGS. 7 and 8.

Figure 5:
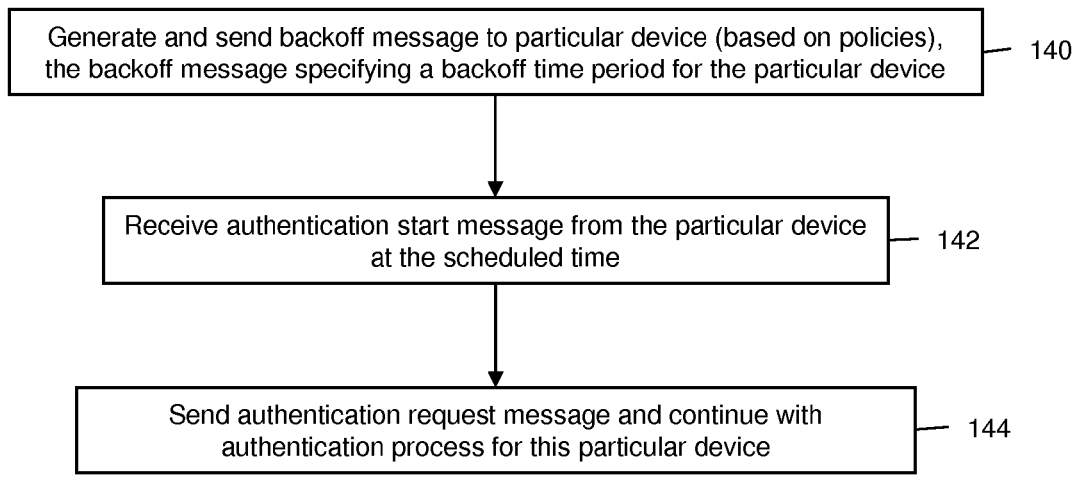
FIG. 5 is a flow chart depicting examples of operations for the controlled scheduling of authentication of devices according to another embodiment.

FIG. 5 illustrates another example for scheduling authentication of devices as depicted by operation 120 shown in FIG. 3. At 140, a backoff message is generated and transmitted to the particular device. In generating the backoff message, the FAR 40 determines an amount of time that the particular device is to refrain from further transmissions (retransmissions) of authentication start messages, and generates a backoff time period that specifies the amount of time the particular device should backoff. In so doing, the backoff message schedules a future timeslot when the particular device is to send its authentication start message, and when the FAR 40 desires to authenticate that particular device. The FAR 40 determines the time period indicated in the backoff message based on any of the information described in connection with the determination made at operation 120 (in FIG. 3), and further examples of which are described hereinafter. When the particular device receives the backoff message, it will interpret it and know that it should wait for the specified time period before retrying authentication and it will not retry/retransmit its authentication start message until the time period has elapsed. This eliminates superfluous traffic in the LLN.

When the backoff time period expires at the particular wireless device that received the backoff message, it sends the authentication start message again. At 142, the FAR 40 receives an authentication start message from the particular device at the scheduled time based on the backoff time period indicated in the backoff message previously sent to the particular device. At 144, the FAR 40 sends an authentication request message to the particular device and continues with the authentication process for the particular device. Since the FAR 40 had explicitly scheduled and dedicated this timeslot for the particular device, it is expected that the authentication transaction will complete without contending with other simultaneous transactions. In other words, the FAR 40 can schedule the authentication of the particular device at a time when the FAR 40 knows it will be more available for authenticating the particular device given the other responsibilities of the FAR 40 at that general time period.

The FAR can schedule the particular device for authentication according to various policies. For example, the time period scheduled for authenticating may be set according to relative importance or priority of a particular device. Some devices that are more "mission critical" devices, such as distribution switches, may be given higher priority for authentication. The FAR 40 would schedule authentication of those devices sooner to ensure that the higher priority devices are authenticated before lower priority devices. In another example, the FAR 40 would schedule authentication for devices based on their distance or hop count from the FAR 40 so that devices closer (in hop count) to the FAR are authenticated first. This would allow for authenticating the LLN in concentric circles, moving outward from the FAR 40. In still another example, the FAR 40 would schedule authentication based on relative signal strength for signals received from the device. Again, this would allow the FAR 40 to authenticate the more likely "child" nodes in the mesh before other nodes. Other policies may also be employed for scheduling the authentication of devices, as described hereinafter.

Figure 6:
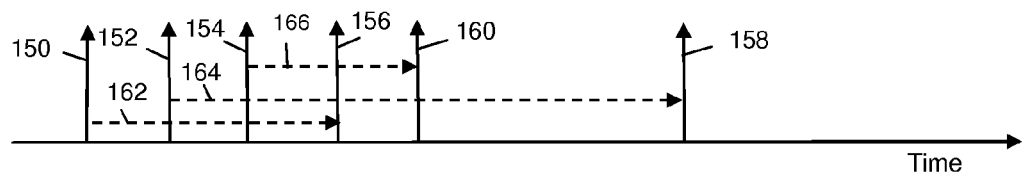
FIG. 6 is a timing diagram depicting an example of the controlled scheduling of authentication of devices.

FIG. 6 shows an example where authentication start messages shown at 150, 152 and 154 are received from three different devices. Message 150 is received first in time, then message 152 and then message 154. Message 150 is received from a first device that has a relatively high priority, message 152 is received from a second device that has a relatively low priority, and message 154 is received from a third device that has a relatively high priority. The priority associated with these devices may be for any of a variety of reasons as described herein.

When the FAR 40 receives these messages, it will schedule authentication to start at 156, 158 and 160 for the first, second and third devices, respectively. The first device is scheduled at 156. The FAR 40 schedules authentication for the second device at 158, a significant amount of time after the receipt of the message 152 since the second device is a relatively low priority device. The FAR 40 schedules the third device for authentication at 160 shortly after authentication of the first device at 156. If the techniques of FIG. 3 are employed, then the FAR 40 sends the authentication request messages to the respective first, second and third devices at the time instances indicated at 156, 158 and 160. If the techniques of FIG. 4 are employed, the FAR 40 sends backoff messages specifying backoff time periods 162, 164 and 166, respectively, to the first, second and third devices, and the first, second and third devices will re-send their authentication start messages at the corresponding times. As described below in connection with FIG. 7, the use of backoff messages may be employed even when the Authenticator schedules the authentication procedure by sending the authentication request message at a scheduled time for a particular device. In this latter scenario, the backoff messages are useful to prevent devices from flooding the network with authentication start messages.

Figure 7:
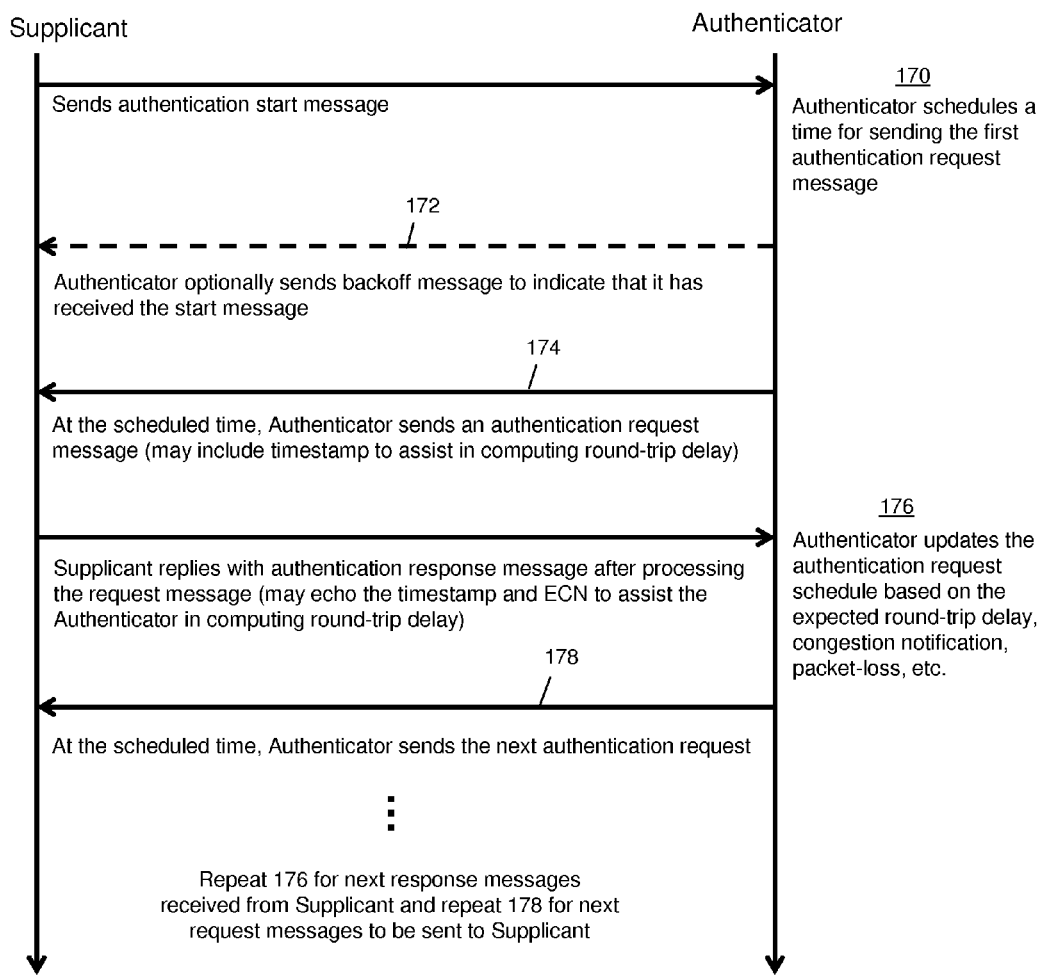
FIG. 7 is a ladder diagram depicting in more detail operations of the authenticator device in controlling the scheduling of authentication messages according to the embodiment of FIG. 4.
Figure 8:
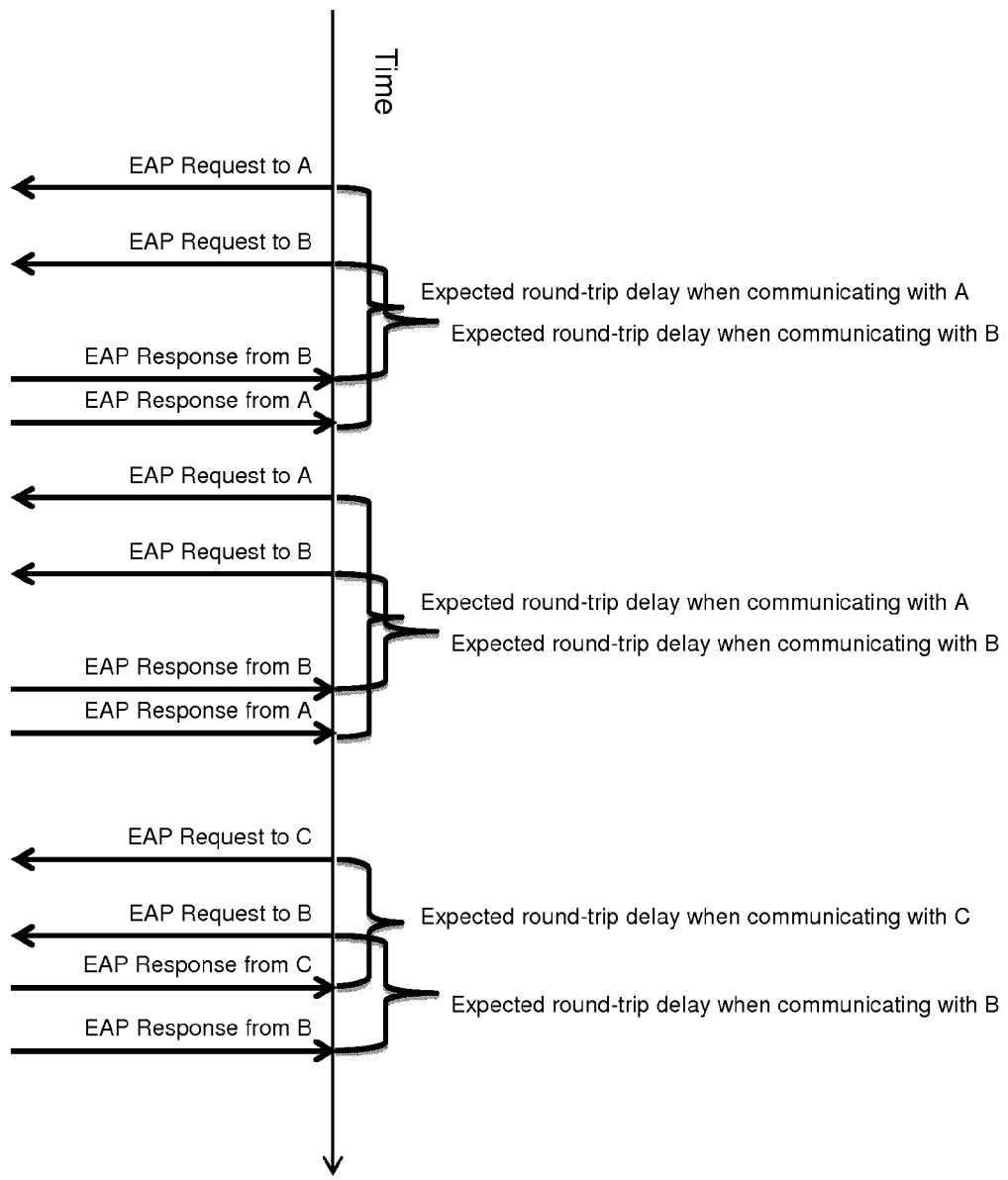
FIG. 8 is a timing diagram depicting examples of the controlled scheduling operations shown in FIG. 7.

Reference is now made to FIGS. 7 and 8 for a description of operations of the authentication scheduling process logic 100 according to a variation or extension of the embodiment depicted in FIG. 3. In this example, a round-trip time for a request-response EAP transaction is considered because it plays a role in the average network utilization of the FAR's link. The round-trip time also varies based on the number of hops to a particular device from the FAR, transient network characteristics (e.g., queuing delay), and transient link characteristics (e.g., loss rates and interference). The Authenticator can obtain indications of current network utilization in a number of ways:

1) When the FAR and Authenticator are co-located (e.g., the FAR 40 is the Authenticator), the Authenticator may utilize routing information collected at the FAR 40 when available. For example, the non-storing mode of the Routing Protocol for Low Power and Lossy Networks (RPL) collects Directed Acyclic Graph (DAG) information at the FAR. Using the RPL routing information, the Authenticator can determine the number of hops to reach a particular device.

2) The Authenticator includes timing information (a timestamp) when sending authentication request messages to devices. The devices will include this timestamp information in the messages they send to the Authenticator. This allows the Authenticator to compute the round-trip delay after receiving a valid response from a device.

3) The Authenticator records the success rate of a request-response transaction.

4) If IP forwarders in the LLN support explicit congestion notification, e.g., Explicit Congestion Notification (ECN), the Authenticator may utilize such information contained in received authentication messages.

Using some or all of the above information, the Authenticator (FAR) can compute the expected round-trip time or delay. The Authenticator can also determine the number of simultaneous request-response transactions it can have outstanding to different Joining Devices. To do so, the Authenticator builds a request transmission schedule by also considering the expected times that the responses will return. As such, the Authenticator can space out authentication request message transmission times to ensure that the average rate of sending request messages and receiving reply messages will likely remain below a configured threshold. Using explicit congestion information, the Authenticator can temporarily pause the negotiation and progress the negotiation with a different Joining Device with the intent of avoiding the congestion area. If the Authenticator wants to temporarily pause an active Joining Device (one that is in the process of being authenticated), it may send a message (similar to the backoff message) indicating not to expect any request messages for some time. This is useful since the Joining Device will implement a timeout mechanism to avoid stalls in the authentication process. The backoff message also serves to avoid premature timeouts simply because the Authenticator paused.

Alternatively, the Authenticator may include the expected and/or worst-case time delay until the next authentication request message.

According to the techniques described herein, the Authenticator is responsible for retransmitting request messages and the estimated round-trip time is used to determine the timeout. The Authenticator increases the period for consecutive retransmission. If the Authenticator fails to receive a response after a number of requests, it may pause the negotiation and progress the negotiation with a different Joining Device.

Joining Devices occasionally send Access Request messages while they are waiting to negotiate network access. It is therefore beneficial for the Authenticator to grant (or deny) access for Joining Devices as quickly as possible. As such, the Authenticator may prioritize devices that have a shorter expected round-trip time for request-response transactions. Serving such devices first will reduce the number of simultaneous negotiations an Authenticator can have with a Joining Device, but one goal is to fully complete the negotiation with individual devices as quickly as possible.

FIG. 7 shows examples of operations performed at the Authenticator (e.g., the FAR). A Joining Device sends an authentication start message (e.g., EAPOL START message) and this message may include number of hops, timestamp, start attempts, and device type to assist the Authenticator in computing round-trip time/delay and assess when to schedule authentication for the particular device. Forwarding devices may mark the packet with an ECN. The Joining Device may retransmit the authentication start messages if no EAPOL request messages are received from the Authenticator. At 170, the Authenticator schedules a time for sending the first authentication request message (e.g., an EAPOL request message), taking into account the device type for prioritization, network utilization as indicated by round-trip delay, ECN or other information, number of hops to the Joining Device, and number of other Supplicants being scheduled for authentication. At operation 170, the Authenticator may obtain information from the received authentication start message that enables the Authenticator to determine the indication of the current network utilization, such as from a congestion notification in the authentication start message, a round-trip time delay computed by the Authenticator based on timestamp information contained in the authentication start message, packet-loss information, etc. The time/schedule for engaging in the authentication procedure may be based on the number of hops between the particular device (Supplicant) and the Authenticator such that devices closer in hops to the Authenticator are authenticated prior to devices further away in hops from the Authenticator.

As an option, at 172, the Authenticator may send a backoff message (according to the techniques described above in connection with FIG. 4) to indicate that it has received the EAPOL Start message so that the Supplicant can stop sending such messages.

At 174, at the scheduled time, the Authenticator sends an authentication request message (e.g., an EAP Request message) to the particular Joining Device. This message may include a timestamp to assist in computing round-trip delay.

The Supplicant replies after processing the authentication request message sent at 174. The Supplicant may echo the timestamp in its authentication response messages sent to the Authenticator to assist the Authenticator in computing round-trip delay, and may also include ECN or other information that indicates current network utilization. Forwarding devices may mark messages with ECN. At 176, the Authenticator updates the authentication request (e.g., EAP Request) schedule based on an indication of the current network utilization, which may be based on the round-trip delay computed from the timestamp information that the Authenticator included in the request message sent to the Supplicant, congestion notification contained in the message received from the Supplicant, packet loss, etc. Other sources of indications of current network utilization include send/receive rate on the FAR's (wireless) link, channel-busy indications when using clear-channel assessment, etc. Also, a schedule may be updated based on the type of Joining Device. At 178, at the updated scheduled time, the Authenticator sends the next authentication request message (e.g., EAP Request) destined for the particular Joining Device (Supplicant), and this message may include a timestamp to assist in computing round-trip delay for the next iteration. Operation 176 is repeated for the next response message received from the Supplicant and operation 178 is repeated for the next authentication message sent to the Supplicant. Thus, operations 176 and 178 are repeated to update a schedule for transmitting subsequent authentication request messages to the Joining Device until the Joining Device is authenticated or fails authentication.

FIG. 8 shows an example schedule of authentication requests for various scenarios according to the methodology depicted in FIG. 7. The message exchanges at the top and middle portion of FIG. 7 are for two Supplicants, A and B. The message exchanges at the bottom portion of FIG. 7 are for a third Supplicant, C, and Supplicant B.

One goal of the techniques described herein is to schedule authentication traffic such that it does not exceed some defined policy or criteria pertaining to an amount of traffic to be allocated for authentication of wireless devices. For example, the policy may be such that authentication traffic does not exceed X packets per second, i.e., for any given time window, the number of packets should not exceed X*T where T is the duration of the window in seconds. In another example, the policy may be the number of authentication completions for a given period of time.

Upon receiving an EAPOL START message or an EAP Response from a Joining Device, the Authenticator updates its information for the Joining Device (e.g., round-trip delay, congestion, packet loss rate) and adjusts the schedule for sending an EAP Request to that Joining Device accordingly. The Authenticator may delay EAP Requests if a higher-priority Joining Device appears or if the round-trip delay becomes smaller. In general, a smaller round-trip delay means more traffic in a shorter period of time. The Authenticator may schedule EAP Requests sooner if the round-trip delay increases because in general a larger round-trip delay means less traffic over the same period of time.

When there are too many Supplicants to service simultaneously, the Authenticator may have to delay servicing some Supplicants until after it has finished authenticating other Supplicants. The Authenticator may prioritize the nodes based on an expected time to complete authentication to service Supplicants as quickly as possible, number of hops from the Authenticator in order to service the closer Supplicants first so that they can begin serving as Authenticators for other Supplicants, or based on device type in order to meet some application-specific goals, e.g., authenticate more "mission" critical distribution automation devices before electric meters.

In summary, the techniques depicted in FIGS. 7 and 8 involve scheduling network access control transmissions in an LLN where the Authenticator and Joining Device may be separated by multiple hops, in order to control or manage how much network bandwidth is utilized subject to predetermined criteria or within a configurable threshold. This is achieved by one or more of: an Authenticator collecting round-trip time delay information for request-response transactions to assist with computing the expected link utilization; an Authenticator scheduling request messages such that the expected link utilization at the FAR caused by transmitting requests and receiving replies is within or below a configurable threshold; an Authenticator using explicit congestion notifications to temporarily pause negotiation for one Joining Device and resume negotiation for a different Joining Device to avoid network congestion and complete negotiations more quickly; an Authenticator using round-trip timing to set a retransmission timer; an Authenticator using message-loss to temporarily stopping the authentication procedure for one Joining Device and resume/engage an authentication procedure (negotiation) for a different Joining Device to complete authentication negotiations more quickly; and an Authenticator using round-trip timing and packet loss rate information to prioritize Joining Devices that are likely to complete their negotiation more quickly.

The techniques described herein are useful in the authentication of a mesh comprising a large number of devices, by enabling controlled and orderly authentication of devices in the mesh in the case of flooding of authentication requests. These techniques also provide for implementation of policies in how the mesh is brought up. Unnecessary transmissions and retransmission are reduced, saving power and battery life in low-power mesh devices. In addition, these techniques are useful to allow mesh devices to migrate to another network, if available, in order join faster in the network.

Other advantages include increasing the rate of granting (or denying) access requests by (i) allowing the Authenticator to negotiate with multiple Joining Devices simultaneously, (ii) prioritizing Joining Devices that are likely to complete the negotiation more quickly, and (iii) temporarily pausing negotiations with Joining Devices that are experiencing congestion or high loss and resuming negotiations with other Joining Devices. In addition, these techniques control the link utilization at the FAR dedicated to network access control by scheduling request transmissions based on the expected round-trip time of request-response transactions.

The above description is intended by way of example only.

What is claimed is:

1. A method comprising:
    at an authenticator device that is configured to authenticate devices in a lossy network, receiving an authentication start message configured to initiate an authentication procedure from a particular device to be authenticated;
    at the authenticator device, delaying the authentication procedure and determining a schedule for engaging in the authentication procedure for the particular device based on an indication of current network utilization;
    transmitting across the lossy network from the authenticator device to the particular device an authentication request message configured to re-initiate the delayed authentication procedure; and
    receiving a re-initiating authentication start message from the particular device.

2. The method of claim 1, wherein:
    determining comprises scheduling a time for re-initiating the authentication procedure, and
    transmitting the authentication request message destined for the particular device comprises transmitting the authentication request at the scheduled time for re-initiating the authentication procedure.

3. The method of claim 1, and further comprising including timestamp information in the authentication request message to facilitate computing of round-trip time delay based on messages received from the particular device.

4. The method of claim 1, and further comprising receiving an authentication response message from the particular device sent in response to the authentication request message, and further comprising determining a time for sending a next authentication request message as part of the authentication procedure with the particular device based on the indication of current network utilization.

5. The method of claim 4, and further comprising transmitting the next authentication request message destined for the particular device at the determined time, receiving a next authentication response message from the particular device, and repeating said receiving and determining to update a schedule for transmitting subsequent authentication request messages to the particular device with reception of each authentication response message.

6. The method of claim 1, and further comprising obtaining information from the authentication start message received from the particular device to enable the authenticator device to determine the indication of current network utilization.

7. The method of claim 6, wherein obtaining comprises obtaining a congestion notification contained in the authentication start message.

8. The method of claim 6, and further comprising computing a round-trip time delay based on timestamp information contained in the authentication start message, the round-trip time delay serving as the indication of current network utilization.

9. The method of claim 1, and further comprising storing information indicating priority of types of devices such that some devices are assigned a higher relative priority than other devices based on types of service functions the devices perform in a utility network, and wherein determining is based on the stored information.

10. The method of claim 1, wherein determining the time for engaging in the authentication procedure is based on the number of hops between the particular device and the authenticator device such that devices closer in hops to the authentication device are authenticated prior to devices further in hops from the authentication device.

11. The method of claim 1, wherein determining comprises determining an amount of time that the particular device is to refrain from further transmissions of authentication start messages, and wherein transmitting the authentication request message comprises transmitting a backoff message containing information for a backoff time period specifying the amount of time for the particular device to backoff, and transmitting the backoff message to the particular device.

12. The method of claim 11, and further comprising receiving from the particular device an authentication start message at a time based on the backoff time period, and engaging in the authentication procedure for the particular device.

13. The method of claim 1, wherein determining is based on criteria pertaining to an amount of traffic to be allocated by the authenticator device for authentication of devices.

14. The method of claim 1, and further comprising temporarily stopping the authentication procedure with the particular device when it is determined that messages are not being received by and/or from the particular device, and engaging in the authentication procedure with another device.

15. The method of claim 1, wherein determining the schedule is based on a number of other devices scheduled for authentication.

16. The method of claim 1, wherein determining the schedule is based further on a priority associated with the particular device.

17. The method of claim 16, and further comprising prioritizing devices seeking authentication that are more likely to complete the authentication procedure relatively quickly based on at least one of round-trip timing and packet loss information.

18. An apparatus comprising:
a network interface unit configured to enable communications over a wide area network;
a transceiver unit configured to transmit and receive signals over a lossy network;
a processor coupled to the network interface unit and transceiver unit, the processor configured to:
receive an authentication start message configured to initiate an authentication procedure, from a particular device to be authenticated,
delay the authentication procedure and determine a schedule for engaging in the authentication procedure for the particular device based on an indication of current network utilization,
transmit across the lossy network an authentication request message configured to re-initiate the delayed authentication procedure to the particular device; and
receive a re-initiating authentication start message from the particular device.

19. The apparatus of claim 18, wherein the processor is configured to determine a time for re-initiating the authentication procedure, and to cause the transceiver unit to transmit the authentication request message destined for the particular device at the scheduled time for re-initiating the authentication procedure.

20. The apparatus of claim 18, wherein the processor is further configured to determine, based on the indication of current network utilization, a time for sending a next authentication request message as part of the authentication procedure with the particular device in response to receiving an authentication response message from the particular device.

21. The apparatus of claim 20, wherein the processor is configured to cause the transceiver unit to transmit the next authentication message destined for the particular device at the determined time, and to update a schedule for transmitting subsequent authentication request messages to the particular device with reception of each authentication response message from the particular device.

22. The apparatus of claim 18, wherein the processor is further configured to determine an amount of time that the particular device is to refrain from further transmissions of authentication start messages, generate the authentication request message comprising a backoff message containing information for a backoff time period specifying the amount of time for the particular device to backoff.

23. The apparatus of claim 22, wherein the processor is further configured to engage in the authentication procedure for the particular device at a time based on the backoff time period.

24. The apparatus of claim 18, wherein the processor is further configured to determine the schedule based on criteria pertaining to an amount of traffic to be allocated for authentication of devices.

25. The apparatus of claim 18, wherein the processor is further configured to determine the schedule based on a number of other devices scheduled for authentication.

26. The apparatus of claim 18, wherein the processor is further configured to determine the scheduled based on a priority associated with the particular device.

27. One or more tangible, non-transitory computer readable storage media encoded with software comprising computer executable instructions and when the software is executed operable to:
at an authenticator device configured to authenticate devices in a lossy network, receive an authentication start message configured to initiate an authentication procedure from a particular device to be authenticated;
delay the authentication procedure and determine a schedule for engaging in the authentication procedure for the particular device based on an indication of current network utilization,
transmit across the lossy network an authentication request message configured to re-initiate the delayed authentication procedure from the authenticator device to the particular device; and
receive a re-initiating authentication start message from the particular device.

28. The computer readable storage media of claim 27, wherein the instructions that are operable to determine comprise instructions operable to determine the schedule based on a number of other devices scheduled for authentication.

29. The computer readable storage media of claim 27, wherein the instructions that are operable to determine comprise instructions operable to determine the schedule based further on a priority associated with the particular device.

30. The computer readable storage media of claim 29, and further comprising instructions operable to prioritize devices seeking authentication that are more likely to complete the authentication procedure relatively quickly based on at least one of round-trip timing and packet loss information.

31. The computer readable storage media of claim 27, wherein the instructions that are operable to determine comprise instructions operable to determine a time for re-initiating the authentication procedure, and to cause the authentication request message to be transmitted by a transceiver unit destined for the particular device at the scheduled time for re-initiating the authentication procedure.

32. The computer readable storage media of claim 31, and further comprising instructions that are operable to determine, based on the indication of current network utilization, a time for sending a next authentication request message as part of the authentication procedure with the particular device in response to receiving an authentication response message from the particular device.

33. The computer readable storage media of claim 32, and further comprising instructions that are operable to cause a transceiver unit to transmit the next authentication message destined for the particular device at the determined time, and to update a schedule for transmitting subsequent authentication request messages to the particular device with reception of each authentication response message from the particular device.

34. The computer readable storage media of claim 27, and further comprising instructions that are operable to determine an amount of time that the particular device is to refrain from further transmissions of authentication start messages, generate the authentication request message comprising a backoff message containing information for a backoff time period specifying the amount of time for the particular device to backoff, and to cause a transceiver unit to transmit the backoff message to the wireless device.

35. The computer readable storage media of claim 27, wherein the instructions that are operable to determine the schedule comprise instructions that are operable to determine the schedule based on criteria pertaining to an amount of traffic to be allocated for authentication of devices.

* * * * *